Aug. 19, 1930.   D. M. POMBO ET AL   1,773,599
SUSPENSION OF VEHICLES, PARTICULARLY OF MOTOR CARS AND THE LIKE
Filed June 14, 1927   2 Sheets-Sheet 1
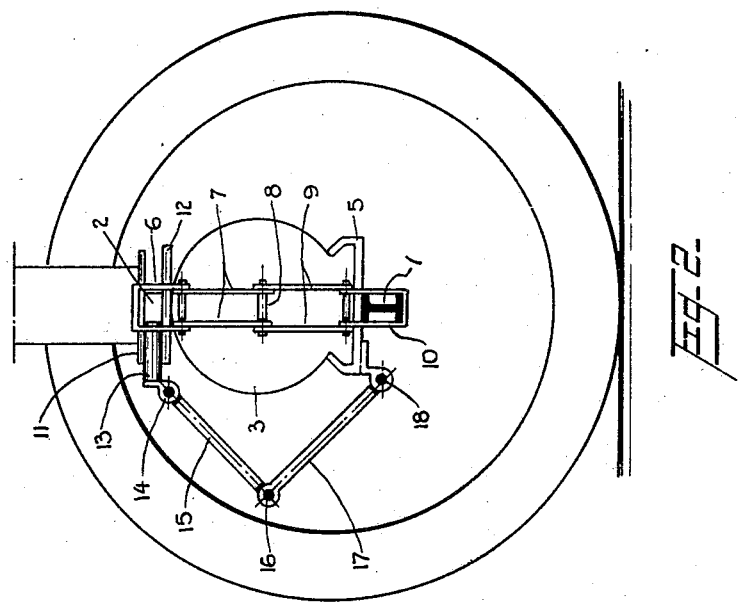
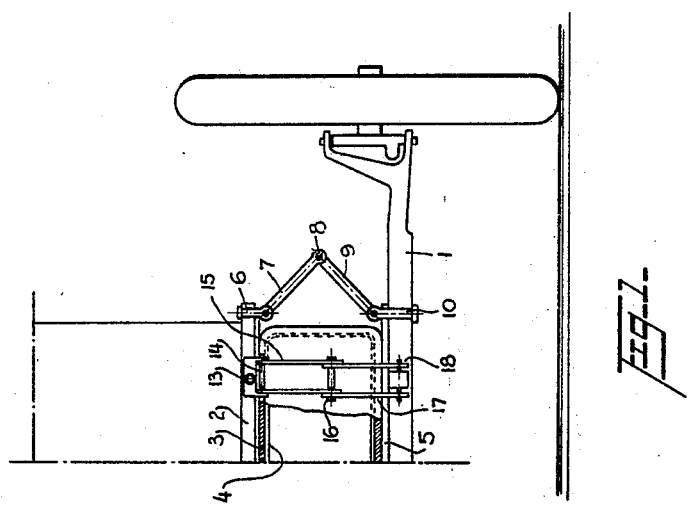
INVENTOR.
Daniel Maria Pombo
and Osvaldo Bruno Andrade
BY
their ATTORNEY.

Aug. 19, 1930.   D. M. POMBO ET AL   1,773,599
SUSPENSION OF VEHICLES, PARTICULARLY OF MOTOR CARS AND THE LIKE
Filed June 14, 1927   2 Sheets-Sheet 2

INVENTORS
Daniel Maria Pombo
Oswaldo Bruno Andrade
BY
their ATTORNEY.

Patented Aug. 19, 1930

1,773,599

UNITED STATES PATENT OFFICE

DANIEL MARIA POMBO AND OSVALDO BRUNO ANDRADE, OF BUENOS AIRES, ARGENTINA

SUSPENSION OF VEHICLES, PARTICULARLY OF MOTOR CARS AND THE LIKE

Application filed June 14, 1927, Serial No. 198,771, and in Argentina April 19, 1927.

Our invention relates to suspension means for vehicles, particularly automotive and similar vehicles, and has essentially for its object to substitute for the usual metal springs, air cushions interposed between the frame and the wheel axles.

The invention also comprises other objects as will hereinafter appear.

In order that the invention may be clearly understood and readily carried into practice, it has been illustrated by way of example in the accompanying drawings as applied to a car of the Ford type.

In these drawings:—

Fig. 1 is an elevational front view of the front wheel ensemble embodying the invention, the left hand side of the figure showing the spring suspension now used.

Fig. 2 is a view toward one of the front wheels as seen from the right in Fig. 1.

Fig. 3 is a similar view as Fig. 1 showing the rear wheel ensemble, while

Figure 4:
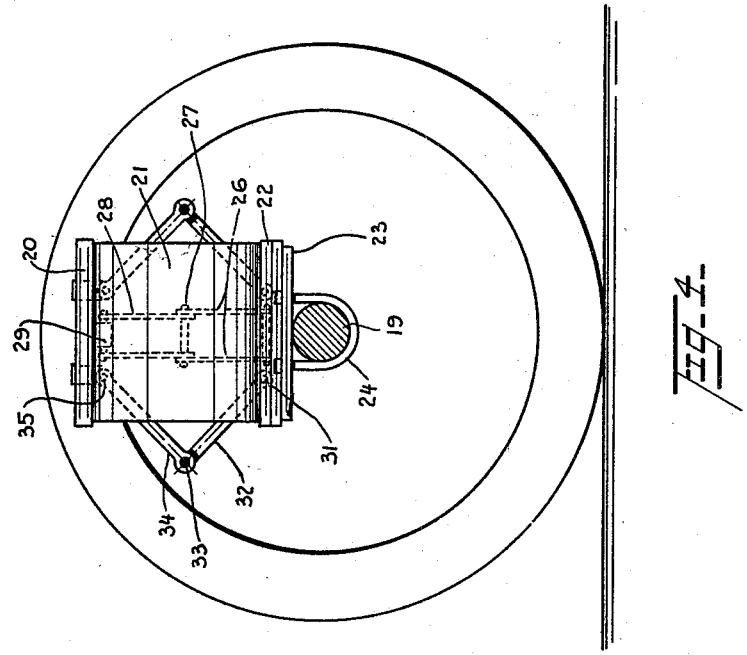
Fig. 4 is a similar view as Fig. 2 toward one of the rear wheels as seen from the left in Fig. 2.
Figure 3:
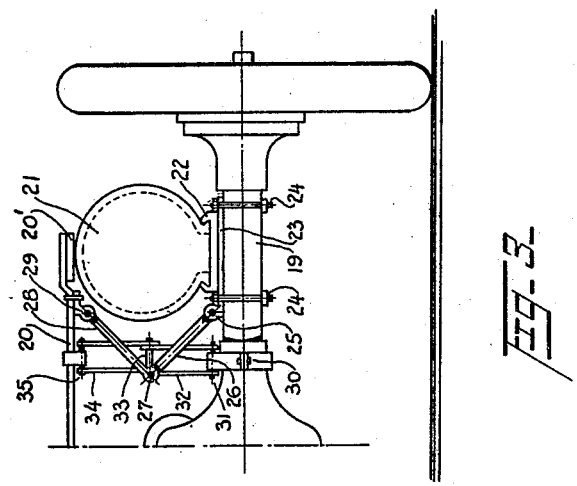

In the drawing 1 indicates the front axle of a Ford car, and 2 is the front cross-beam of its frame. According to the present invention, the usual metal springs are replaced by an air chamber 4 which is placed and supported between the axle 1 and frame 2 in any suitable manner. The air-chamber 4 is provided with a suitable valve (not shown) of well-known construction whereby the pressure in the air-chamber may be adjusted at will, thus securing greater or lesser elasticity in the vehicle, as desired.

As shown, the outer jacket 3 of the air-chamber bears with its bottom portion against a board adequately secured to wheel axle 1, said board having also flanges engaging the beaded edges of outer jacket 3. A double toggle is provided at each side of the frame held thereon by means of stirrups 6 to which are pivotally connected the toggle-members 7 which in turn are pivotally connected to the members 9 by means of pins 8, the other end of members 9 being pivotally connected to stirrups 10 rigidly secured to the axle 1.

In order to prevent undesirable displacements of the frame relative to axle 1, they are provided at the front portion of the vehicle one or two pairs of toggles connecting the frame to the front axle which also permit of a certain degree of tilt of the frame relative to the axle. The said toggles preferably are mounted with their upper portions in a guide 11 within which is housed a cylindrical member 13 to which is linked, at 14, the upper end of the links 15 connected in turn to links 17 by means of pins 16 the latter being pivotally connected with their lower ends to stirrups 18 secured to the axle 1 or to the lower bearing member 5. With its upper part the outer jacket of the air cushion bears against a board 12 adequately secured to the underside of the front cross-beam 2 of the frame.

As concerns the rear wheels, the arrangement used is similar to that just described and there may be employed one, two or more air chambers depending on the particular character and type of the vehicle.

As shown, 19 is the rear axle and 20 is the frame of the vehicle to the bottom of which is secured a board 20' below which is situated the outer jacket 21 of the air chamber. Said jacket is engaged by the flanges 22 of a plate 23 secured to the rear axle by means of the clamping members 24. The rear axle 19 and underframe 20 are connected together by means of a double toggle pivotally connected to the former, with its lower end, by means of pivot 25 of links 26 pivoted to the links 28 by means of a pin, the latter being pivoted to the frame by means of the pivotal connection 29. The pivot pin of the links is indicated at 27. In a similar manner and disposed at substantially right angles, is a clamping member 30 embracing the axle 19 providing a pivotal connection 31 for the links 32 which in turn are pivotally connected, by means of a pin 33, to the links 34 pivotally connected with their upper ends to a clamping member 35 secured to the frame of the vehicle. Of these toggles, one is disposed at the fore part and the other one, in inverted position, at the rear part.

Evidently, the manner of securing the air cushions, and the articulation between the axles and the vehicle frame, may be modified.

It is also evident that various details may be changed without departing from the scope of the present invention which is clearly defined in the appended claim.

We claim:—

In combination with a vehicle frame and the wheel-axle, a pneumatic device interposed between said frame and said axle and comprising an inflatable air-cushion and an outer jacket therefor having beaded edges, a flanged member secured to said wheel-axle and engaging the beaded edges of said jacket, a bearing member on said frame opposite said flanged member freely bearing on said pneumatic device, toggles between said frame and said axle in the same plane with said axle pivotally connected with said frame and said axle, additional toggles intermediate said frame and said axle disposed in a plane at right angles to said axle and likewise pivotally connected with said frame and said axle, sliding parts pivoted to the upper members of said additional toggles, and guides for said sliding parts provided on said frame.

In testimony whereof we affix our signatures.

DANIEL MARIA POMBO.
OSVALDO BRUNO ANDRADE.